(12) United States Patent
Lee

(10) Patent No.: US 10,035,426 B2
(45) Date of Patent: Jul. 31, 2018

(54) BATTERY POWER MANAGEMENT IN HYBRID VEHICLES

(71) Applicant: Ford Global Technologies, LLC, Dearborn, MI (US)

(72) Inventor: Tae-Kyung Lee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 15/066,083

(22) Filed: Mar. 10, 2016

(65) Prior Publication Data

US 2017/0259686 A1    Sep. 14, 2017

(51) Int. Cl.
*H02J 7/00* (2006.01)
*B60L 11/18* (2006.01)

(52) U.S. Cl.
CPC ....... *B60L 11/1861* (2013.01); *B60L 11/1844* (2013.01)

(58) Field of Classification Search
CPC .......................... B60L 11/1861; B60L 11/1844
See application file for complete search history.

(56) References Cited

U.S. PATENT DOCUMENTS

| | | | |
|---|---|---|---|
| 8,706,333 | B2 | 4/2014 | Li |
| 9,091,735 | B2 | 7/2015 | Wang et al. |
| 2013/0278223 | A1 | 10/2013 | Li et al. |
| 2014/0239915 | A1* | 8/2014 | Takahashi ............. H01M 10/44 320/134 |
| 2014/0244225 | A1 | 8/2014 | Balasingam et al. |
| 2015/0081237 | A1 | 3/2015 | Ye et al. |
| 2015/0301117 | A1 | 10/2015 | Wakasugi et al. |

FOREIGN PATENT DOCUMENTS

EP        2930819 A1    10/2015

OTHER PUBLICATIONS

Lee et al., "Electrochemical Li-Ion Battery Modeling for Control Design With Optimal Uneven Discretization," Proceedings of the ASME 2011 Dynamic Systems and Control Conference, Nov. 2, 2011, pp. 1-8, DSCC2011-6094, Arlington, VA, USA.

* cited by examiner

*Primary Examiner* — Vuthe Siek
(74) *Attorney, Agent, or Firm* — Brooks Kushman P.C.

(57) ABSTRACT

A vehicle may include a controller programmed to charge and discharge a battery according to an upper power limit that is based on estimates of ion-concentration profiles in the battery. The controller may be programmed such that for a given state of charge and temperature of the battery, the upper power limit increases as the profiles flatten. The upper power limit may be further based on a difference between a predefined expected power capability limit at the given state of charge and a power capability limit estimated from a voltage output and current input associated with the given state of charge.

18 Claims, 8 Drawing Sheets

BATTERY POWER MANAGEMENT IN HYBRID VEHICLES

TECHNICAL FIELD

This application is generally related to battery power management in hybrid vehicles.

BACKGROUND

Hybrid-electric and pure electric vehicles rely on a traction battery to provide power for propulsion and may also provide power for some accessories. The traction battery typically includes a number of battery cells connected in various configurations. To ensure optimal operation of the vehicle, various properties of the traction battery may be monitored. One useful property is the battery power capability, which is the maximum magnitude of the electric power available for charge/discharge operations. The more accurate the power capability estimations, the more effective battery hardware can be utilized.

SUMMARY

A vehicle may include a controller programmed to charge and discharge a battery according to an upper power limit that is based on estimates of ion-concentration profiles in the battery. The controller may be programmed such that for a given state of charge and temperature of the battery, the upper power limit increases as the profiles flatten. The upper power limit may be further based on a difference between a predefined expected power capability limit at the given state of charge and a power capability limit estimated from a voltage output and current input associated with the given state of charge. The predefined expected power capability limit may be output from a steady-state power capability map. The power capability limit estimated from a voltage output and current input may be output from a real-time power capability estimator. The upper power limit may be conditioned via a transfer function configured to remove perturbations therefrom. The transfer function may be a proportional, integral, and derivative ("PID") controller. The PID controller may have a non-zero proportional and derivative gain.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
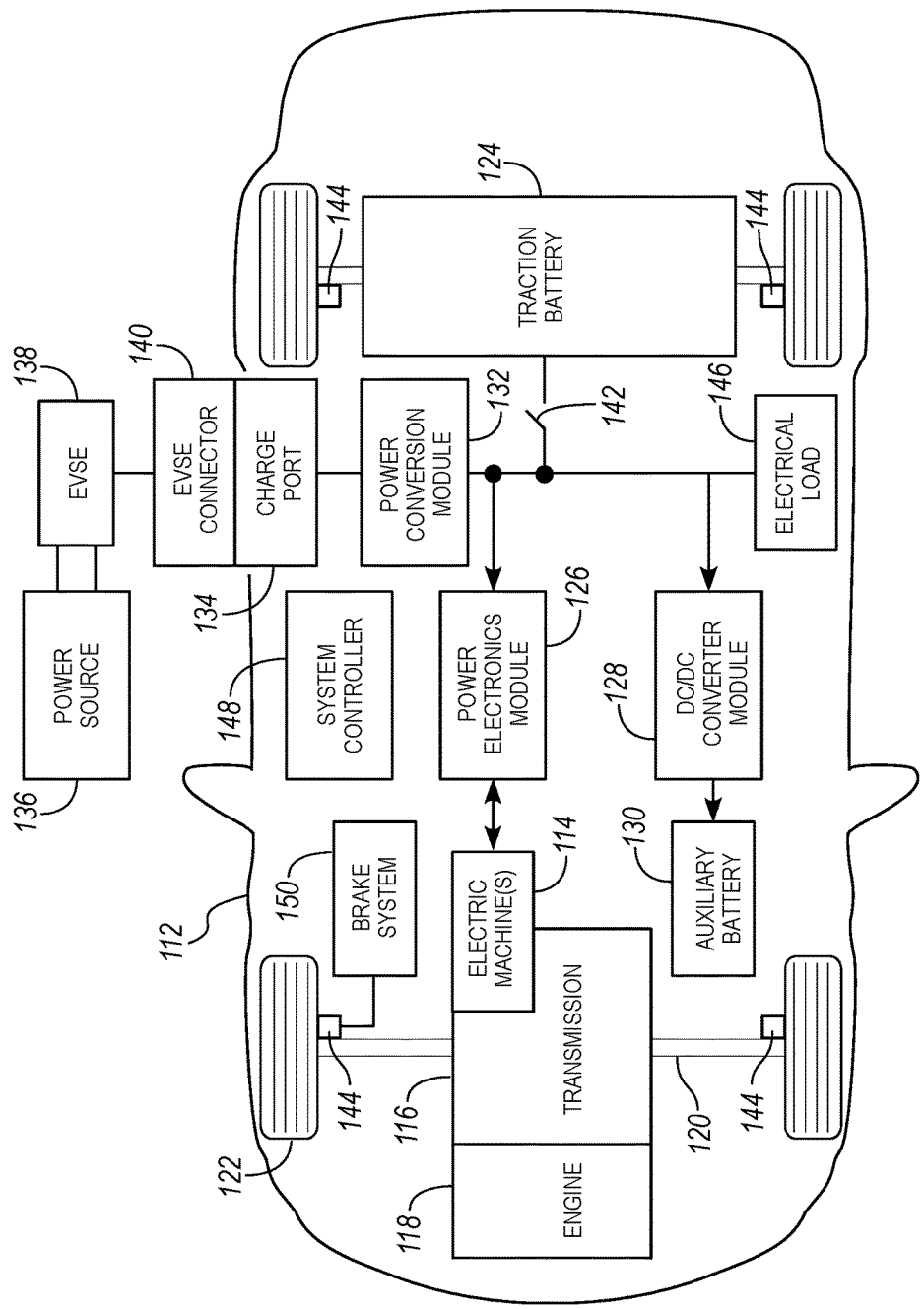
FIG. 1 is a diagram of a hybrid vehicle illustrating typical drivetrain and energy storage components.

FIG. 1 depicts a typical plug-in hybrid-electric vehicle (HEV). A typical plug-in hybrid-electric vehicle 112 may comprise one or more electric machines 114 coupled to a hybrid transmission 116. The electric machines 114 may be capable of operating as a motor or a generator. In addition, the hybrid transmission 116 is coupled to an engine 118. The hybrid transmission 116 is also coupled to a drive shaft 120 that is coupled to the wheels 122. The electric machines 114 can provide propulsion and deceleration capability when the engine 118 is turned on or off. The electric machines 114 also act as generators and can provide fuel economy benefits by recovering energy that would normally be lost as heat in the friction braking system. The electric machines 114 may also reduce vehicle emissions by allowing the engine 118 to operate at more efficient conditions (engine speeds and loads) and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage DC output. The traction battery 124 is electrically connected to one or more power electronics modules. One or more contactors 142 may isolate the traction battery 124 from other components when opened and connect the traction battery 124 to other components when closed. The power electronics module 126 is also electrically connected to the electric machines 114 and provides the ability to bi-directionally transfer energy between the traction battery 124 and the electric machines 114. For example, a typical traction battery 124 may provide a DC voltage while the electric machines 114 may use a three-phase AC current to function. The power electronics module 126 may convert the DC voltage to a three-phase AC current used by the electric machines 114. In a regenerative mode, the power electronics module 126 may convert the three-phase AC current from the electric machines 114 acting as generators to the DC voltage used by the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other vehicle loads. Other high-voltage electrical loads 146, such as compressors and electric heaters, may be connected directly to the high-voltage without the use of a DC/DC converter module 128. The electrical loads 146 may have an associated controller that operates the electrical load 146 when appropriate. The low-voltage systems may be electrically connected to an auxiliary battery 130 (e.g., 12V battery).

The vehicle 112 may be an electric vehicle or a plug-in hybrid vehicle in which the traction battery 124 may be recharged by an external power source 136. The external power source 136 may be a connection to an electrical outlet. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 12. The charge port 134 may be any type of port configured to transfer power from the EVSE 138 to the vehicle 112. The charge port 134 may be electrically connected to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components that work cooperatively to operate the wheel brakes 144. For simplicity, the figure depicts one connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 to decelerate or control the vehicle. The brake system 150 may respond to driver commands and may also operate autonomously to implement features such as stability control. The controller of the brake system 150 may implement a method of applying a requested brake force when requested by another controller or sub-function.

The various components discussed may have one or more associated controllers to control and monitor the operation of the components. The controllers may communicate via a serial bus (e.g., Controller Area Network (CAN)) or via discrete conductors. In addition, a system controller 148 may be present to coordinate the operation of the various components. A traction battery 124 may be constructed from a variety of chemical formulations. Typical battery pack chemistries may be lead acid, nickel-metal hydride (NIMH) or Lithium-Ion.

Figure 2:
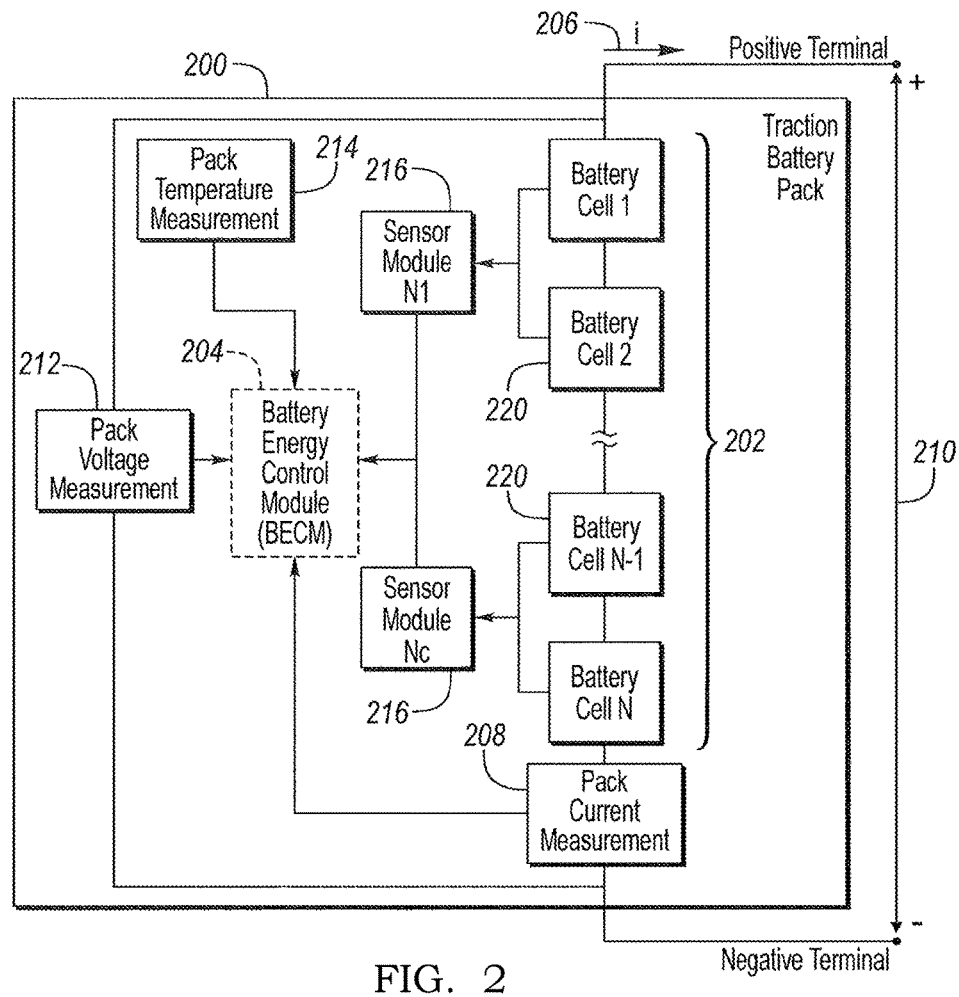
FIG. 2 is a diagram of a possible battery pack arrangement comprised of multiple cells, and monitored and controlled by a Battery Energy Control Module.

FIG. 2 shows a typical traction battery pack 200 in a simple series configuration of N battery cells 202. Battery packs 200, may be composed of any number of individual battery cells connected in series or parallel or some combination thereof. A typical system may have a one or more controllers, such as a Battery Energy Control Module (BECM) 204 that monitors and controls the performance of the traction battery 200. The BECM 204 or other controller may have input channels and output channels. The BECM 204 may monitor several battery pack level characteristics such as pack current 206 that may be monitored by a pack current measurement module 208, pack voltage 210 that may be monitored by a pack voltage measurement module 212 and pack temperature that may be monitored by a pack temperature measurement module 214. The BECM 204 may have non-volatile memory such that data may be retained when the BECM 204 is in an off condition. Retained data may be available upon the next ignition cycle. A battery management system may be comprised of the components other than the battery cells and may include the BECM 204, measurement sensors and modules (208, 212, 214), and sensor modules 216. The function of the battery management system may be to operate the traction battery in a safe and efficient manner.

In addition to the pack level characteristics, there may be battery cell 220 level characteristics that are measured and monitored. For example, the voltage, current, and temperature of each cell 220 may be measured. A system may use a sensor module 216 to measure the characteristics of individual battery cells 220. Depending on the capabilities, the sensor module 216 may measure the characteristics of one or multiple of the battery cells 220. The battery pack 200 may utilize up to $N_c$ sensor modules 216 to measure the characteristics of each of the battery cells 220. Each sensor module 216 may transfer the measurements to the BECM 204 for further processing and coordination. The sensor module 216 may transfer signals in analog or digital form to the BECM 204. In some embodiments, the functionality of the sensor module 216 may be incorporated internally to the BECM 204. That is, the sensor module 216 hardware may be integrated as part of the circuitry in the BECM 204 wherein the BECM 204 may handle the processing of raw signals.

The battery cell 200 and pack voltages 210 may be measured using a circuit in the pack voltage measurement module 212. The voltage sensor circuit within the sensor module 216 and pack voltage measurement circuitry 212 may contain various electrical components to scale and sample the voltage signal. The measurement signals may be routed to inputs of an analog-to-digital (A/D) converter within the sensor module 216, the sensor module 216 and BECM 204 for conversion to a digital value. These components may become shorted or opened causing the voltage to be measured improperly. Additionally, these problems may occur intermittently over time and appear in the measured voltage data. The sensor module 216, pack voltage sensor 212 and BECM 204 may contain circuitry to ascertain the status of the voltage measurement components. In addition, a controller within the sensor module 216 or the BECM 204 may perform signal boundary checks based on expected signal operating levels.

Real-Time Power Capability Estimator

Figure 3:
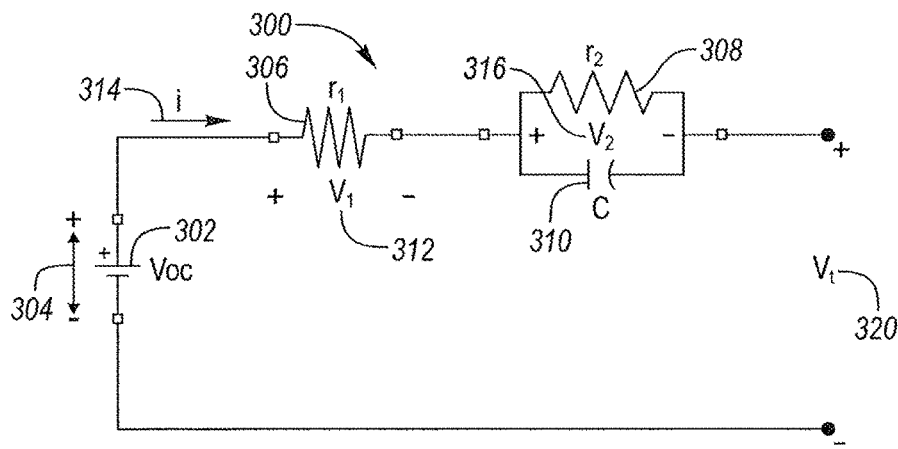
FIG. 3 is a diagram of an example battery cell equivalent circuit with one RC circuit.

A battery cell may be modeled in a variety of ways. For example, a battery cell may be modeled as an equivalent circuit or as an electrochemical battery model. FIG. 3 shows one possible battery cell equivalent circuit model (ECM) 300, called a simplified Randles circuit model. A battery cell may be modeled as a voltage source 302 having an open circuit voltage ($V_{oc}$) 304 having an associated impedance. The impedance may be comprised of one or more resistances (306 and 308) and a capacitance 310. The $V_{oc}$ 304 represents the open-circuit voltage (OCV) of the battery expressed as a function of a battery state of charge (SOC) and temperature. The model may include an internal resistance, $r_1$ 306, a charge transfer resistance, $r_2$ 308, and a double layer capacitance, C 310. The voltage $V_1$ 312 is the voltage drop across the internal resistance 306 due to current 314 flowing from the voltage source 302. The voltage $V_2$ 316 is the voltage drop across the parallel combination of $r_2$ 308 and C 310 due to current 314 flowing through the parallel combination. The voltage $V_t$ 320 is the voltage across the terminals of the battery (terminal voltage). The parameter values, $r_1$, $r_2$, and C may be known or unknown. The value of the parameters may depend on the cell design and the battery chemistry.

Because of the battery cell impedance, the terminal voltage, $V_t$ 320, may not be the same as the open-circuit voltage, $V_{oc}$ 304. As typically only the terminal voltage 320 of the battery cell is accessible for measurement, the open-circuit voltage, $V_{oc}$ 304, may not be readily measurable. When no current 314 is flowing for a sufficiently long period of time, the terminal voltage 320 may be the same as the open-circuit voltage 304, however typically a sufficiently long period of time may be needed to allow the internal dynamics of the battery to reach a steady state. Often, current 314 is flowing in which $V_{oc}$ 304 may not be readily measurable and the value inferred based on the equivalent circuit model 300 may have errors by not capture both fast and slow dynamic properties of the battery. The dynamic properties or dynamics are characterized by a frequency response, which is the quantitative measure of the output spectrum of a system or device (battery, cell, electrode or sub-component) in response to a stimulus (change in current, current profile, or other historical data on battery current). The frequency response may be decomposed into frequency components such as fast responses to a given input and slow responses to the given input. The relative term fast responses and slow responses can be used to describe response times less than a predetermined time (fast) or greater than a predetermined time (slow). To improve battery performance, a model that captures both fast and slow battery cell dynamics is needed. Current battery cell models are complex and are not practical for modern electronic control systems. Here a reduced order battery cell model that is reduced in complexity such that it may be executed on a microcontroller, microprocessor, ASIC, or other control system and captures both fast and slow dynamics of the battery cell is disclosed to increase the performance of the battery system.

Figure 4:
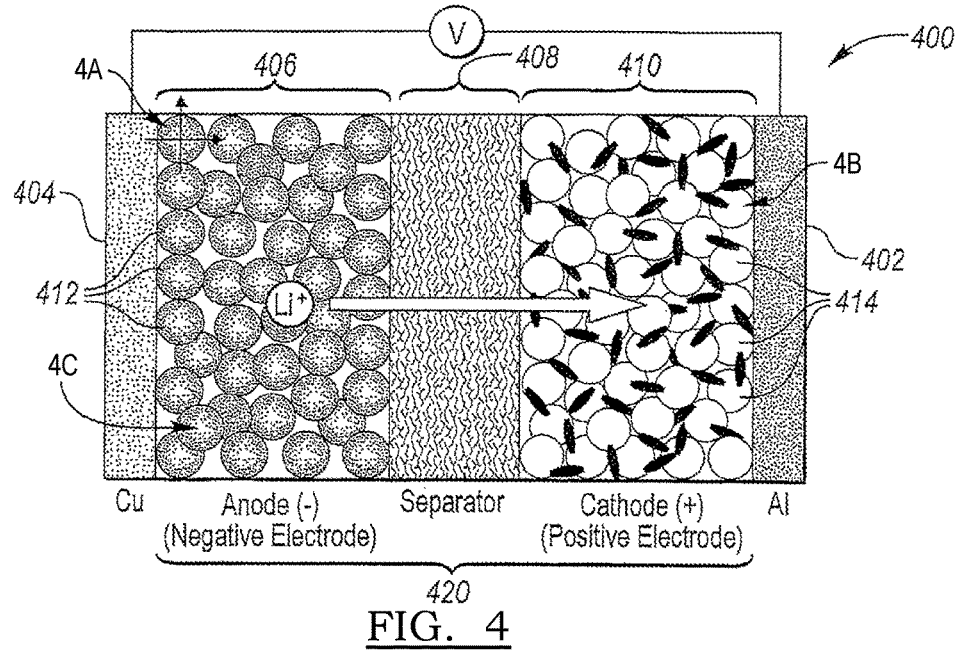
FIG. 4 is an illustration of a cross section of a Metal-ion battery with porous electrodes.
Figures 4A, 4B:
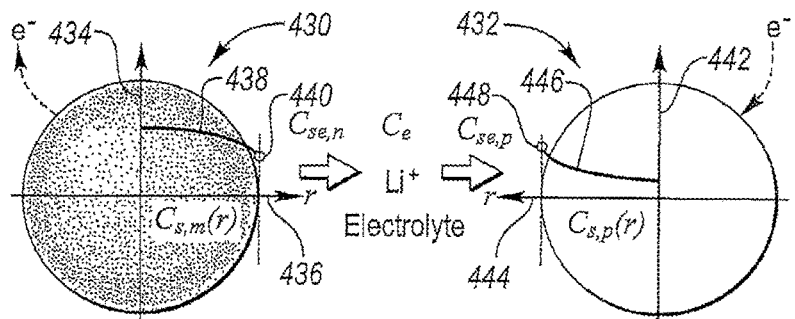
FIG. 4A is an illustration of Li-ion concentration profiles inside representative particles in the negative electrode resulting from the Li-ion diffusion process during discharging.
FIG. 4B is an illustration of Li-ion concentration profiles inside representative particles in the positive electrode resulting from the Li-ion diffusion process during discharging.

FIG. 4 is an illustration of the cross section of the laminated structure of a Metal-ion battery cell 400 or cell. This Metal-ion battery cell 400 may be a Li-ion battery cell. The laminated structure may be configured as a prismatic cell, a cylindrical cell or other cell structure with respect to various packaging methods. The cell geometry or physical structure may be different (e.g. cylindrical, rectangular, etc.), but the basic structure of the cell is the same. Generally, the Metal-ion cell 400, for example a Li-ion battery, includes a positive current collector 402 which is typically aluminum, but may be another suitable material or alloy, a negative current collector 404 which is typically copper, but may be another suitable material or alloy, a negative electrode 406 which is typically carbon, graphite or graphene, but may be another suitable material, a separator 408, and a positive electrode 410 which is typically a metal oxide (e.g. lithium cobalt oxide ($LiCoO_2$), Lithium iron phosphate ($LiFePO_4$), lithium manganese oxide ($LMnO_2$)), but may be another suitable material. Each electrode (406, 410) may have a porous structure increasing the surface area of each electrode, in which Metal-ions (e.g. Li-ions) travel across the electrode though the electrolyte and diffuse into/out of electrode solid particles (412, 414).

There are multiple ranges of time scales existent in electrochemical dynamic responses of a Metal-ion battery 400. For example with a Li-ion battery, factors which impact the dynamics include but are not limited to the electrochemical reaction in active solid particles 412 in the electrodes and the mass transport of Lithium-ion across the electrodes 416. When considering these aspects, the basic reaction in the electrodes may be expressed as

$$\Theta + Li^+ + e^- \leftrightarrows \Theta - Li \quad (1)$$

In which $\Theta$ is the available site for intercalation, $Li^+$ is the Li-ion, $e^-$ is the electron, and $\Theta-Li$ is the intercalated Lithium in the solid solution.

Figure 4C:
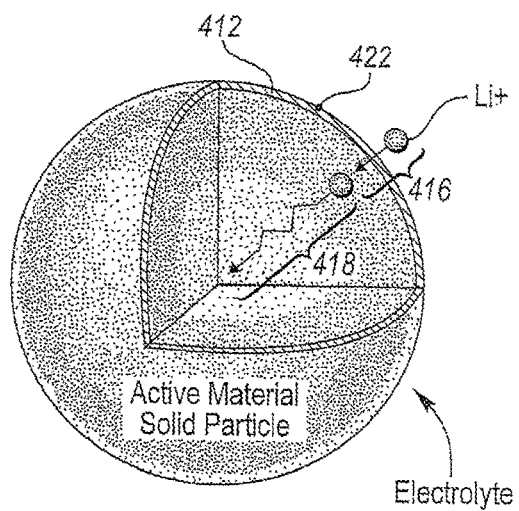
FIG. 4C is an illustration of an active material solid particle and Li-ion transfer and diffusion processes.

This fundamental reaction expressed by equation (1) is governed by multiple time scale processes. This is shown in FIG. 4C, in which the categories of the processes include charge transfer 416, diffusion 418, and polarization 420. These terms differ from the definitions used by the electrochemical society to facilitate a reduced-order electrochemical battery model derivation. Here, the charge transfer process 416 represents the Metal-ion exchange behavior across the solid-electrolyte interface (SEI) 422 at each active solid particle (412, 414). The charge transfer process is fast (e.g. less than 100 milliseconds) under most cases and directly affected by the reaction rate at each electrode (406 & 410). There are multiple frequency components for the charge transfer, the charge transfer consists of both fast and slow dynamics, or in other words the charge transfer has frequency components less and greater than a predetermined frequency. The diffusion process 418 represents the Metal-ion transfer from the surface to the center of the solid particle or vice versa. The diffusion process is slow (e.g. greater than 1 second) and is determined by the size and material of active solid particle (412, 414), and the Metal-ion intercalation level. There are multiple frequency components for the diffusion process, the diffusion process consists of both fast and slow dynamics, or in other words the diffusion process has frequency components less and greater than a predetermined frequency. The polarization 420 process includes all other conditions having inhomogeneous Metal-ion concentrations in the electrolyte or electrode in space. The polarization 420 caused by the charge transfer 416 and the diffusion 418 is not included in this categorization. There are multiple frequency components for the polarization, the polarization consists of both fast and slow dynamics, or in other words the polarization has frequency components less and greater than a predetermined frequency.

The anode 406 and cathode 410 may be modeled as a spherical material (i.e. spherical electrode material model)

as illustrated by the anode spherical material 430 and the cathode spherical material 432. However other model structures may be used. The anode spherical material 430 has a metal-ion concentration 434 which is shown in relation to the radius of the sphere 436. The concentration of the Metal-ion 438 changes as a function of the radius 436 with a metal-ion concentration at the surface to electrolyte interface of 440. Similarly, the cathode spherical material 432 has a metal-ion concentration 442 which is shown in relation to the radius of the sphere 444. The concentration of the Metal-ion 446 changes as a function of the radius 444 with a metal-ion concentration at the surface to electrolyte interface of 448.

Figure 5:
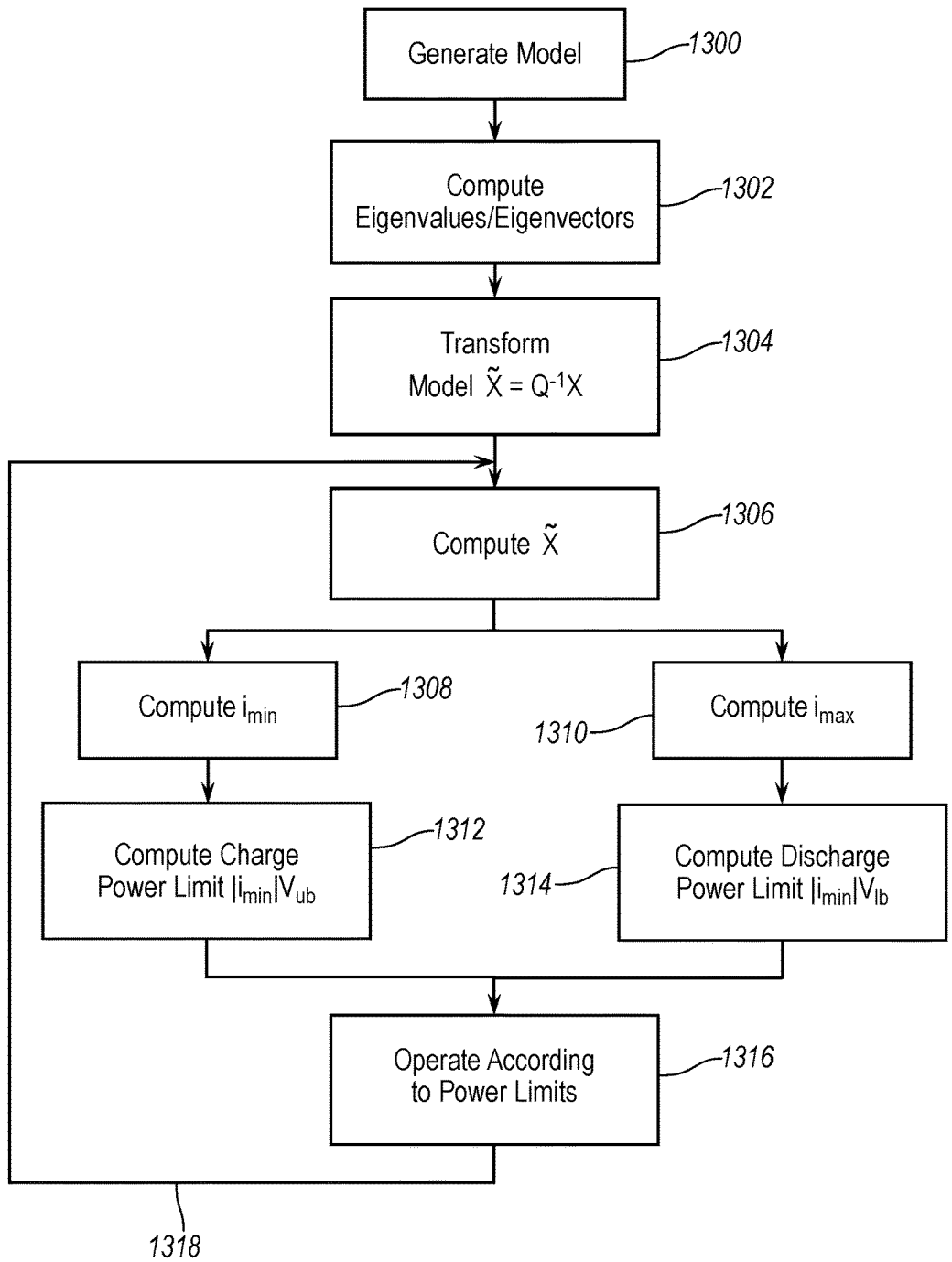
FIG. 5 is a flowchart illustrating possible operations for battery power capability determination.

A flowchart for determining battery power limits is shown in FIG. 5. The processes may be implemented in one or more controllers. The controller may be programmed with instructions to implement the operations described herein. Operation 1300 may be implemented to generate the model as described herein.

An electrochemical battery model 1300 may be expressed in a state-space from as $$\dot{x} = Ax + Bu, \quad (2)$$

where $x = c_s^{eff}$ is the effective Li-ion concentration n-by-1 vector accounting for the slow-to-medium dynamics terms, A is the n-by-n system matrix that characterize the slow-to-medium dynamics of the battery, B is the n-by-1 input matrix that directly relates the input to the rate of state variables, and u is the input to the system, i.e., the battery current. A is also the function of the parameters related to battery capacity and dynamics.

An output, y, of the system may be the terminal voltage and may be expressed as:

$$y = Cx + Du \quad (3)$$

Via the Eigen decomposition process, the system matrix, A, may be represented as $Q\Lambda Q^{-1}$, where Q is an n-by-n matrix whose $i^{th}$ column is a basis eigenvector $q_i$ and $\Lambda$ is a diagonal matrix whose diagonal elements are corresponding eigenvalues. Operation 1302 may be implemented to compute the eigenvalues and eigenvectors of the system matrix.

Defining a transformed state vector as $\tilde{x} = Q^{-1}x$, a transformed model may be expressed as:

$$\dot{\tilde{x}} = \tilde{A}\tilde{x} + \tilde{B}u \quad (4)$$

$$y = \tilde{C}\tilde{x} + \tilde{D}u \quad (5)$$

where the transformed state-space system matrices are expressed as:

$$\tilde{A} = \Lambda \quad (6)$$

$$\tilde{B} = Q^{-1}B \quad (7)$$

$$\tilde{C} = HQ \quad (8)$$

$$\tilde{D} = D \quad (9)$$

The transformed battery model may be further simplified and expressed as:

$$\dot{\tilde{x}} = -\lambda_i \tilde{x}_i + \tilde{B}_{i,1} u \quad (10)$$

$$y = \Sigma_i \tilde{C}_{1,i} \tilde{x}_i + \tilde{D}u \quad (11)$$

where $\lambda_i$ is the eigenvalue at the $i^{th}$ row and $i^{th}$ column of the diagonal matrix, $\Lambda$, and $\tilde{x}_i$ is the $i^{th}$ state variable in $\tilde{x}$. The output, y, corresponds to terminal voltage and the input, u, corresponds to the battery current. Each transformed state is a function of the corresponding eigenvalue and the corresponding element of the transformed input matrix. The output is a function of the transformed state and the transformed output matrix. The eigenvalues of the original system matrix are the same as the eigenvalues for the transformed system matrix. After transformation by the transformation matrix, the state variables are independent of one another. That is, the gradient for the state variables is independent of the other state variables.

Operation 1304 may be implemented to transform the original model into the diagonalized form. The transformed states are based on the effective Li-ion concentrations that make up the original state vector. Note that operations 1300 through 1304 may be performed off-line at system design time. Operation 1306 may be implemented to compute the transformed state given by equation (38).

The battery current limit for the predetermined time period may be calculated as the magnitude of the battery current that causes the battery terminal voltage to reach the battery voltage limits. The battery voltage limits may have an upper limit value for charging and a lower limit value for discharging. The battery terminal voltage with a constant battery current input over a predetermined time period may be computed by letting the battery current input be a constant value during a predetermined time period, $t_d$. By solving equations (10) and (11) with the constant current, i, and the predetermined time period, $t_d$, the battery terminal voltage, $v_t$, may be expressed as:

$$v_t = v_{OC} - \sum_i^n \tilde{C}_{1,i}\tilde{x}_{i,0}e^{-\lambda_i t_d} - \left(R_0 - \sum_i^n \tilde{C}_{1,i}(1 - e^{-\lambda_i t_d})\frac{\tilde{B}_{i,1}}{\lambda_i}\right)i \quad (12)$$

The battery current limit for the time period, $t_d$, may be computed by setting $v_t$ to $v_{lim}$, in equation (12) to obtain:

$$i = \frac{v_{OC} - v_{lim} - \sum_i^n \tilde{C}_{1,i}\tilde{x}_{i,0}e^{-\lambda_i t_d}}{R_0 - \sum_i^n \tilde{C}_{1,i}(1 - e^{-\lambda_i t_d})\frac{\tilde{B}_{i,1}}{\lambda_i}} \quad (13)$$

where $v_{lim}$ corresponds to a terminal voltage limit that may represent an upper voltage bound for charging or a lower voltage bound for discharging. The variable $v_{oc}$ represents the open-circuit voltage of the cell at a given battery SOC. The quantity $\tilde{x}_{i,0}$ is an initial value of the transformed state variable at the present time. The initial value may be a function of the Li-ion concentrations. $R_o$ is the effective internal battery resistance. The time, $t_d$, may be a predetermined time period for the battery current limit computation.

Operation 1308 may be implemented to compute a minimum battery current limit based on an upper bound voltage for $v_{lim}$. Operation 1310 may be implemented to compute a maximum battery current limit based on a lower bound voltage for $v_{lim}$.

The behavior of the numerator is such that for large time horizons, $t_d \gg 0$, the numerator summation term becomes small. The behavior of the denominator is such that for a large time horizon, the denominator summation term becomes a function of the eigenvalues and the transformed input and output matrices. For a small time horizon, the denominator summation term becomes zero so that only the effective resistance term remains.

Charge and discharge power limits 1312, 1314 may be computed as follows:

$$P_{lim,charge} = |i_{min}|v_{ub} = \left|\frac{v_{OC} - v_{ub} - \sum_i^n \tilde{C}_{1,i}\tilde{x}_{i,0}e^{-\lambda_i t_d}}{R_0 - \sum_i^n \tilde{C}_{1,i}(1 - e^{-\lambda_i t_d})\frac{\tilde{B}_{i,1}}{\lambda_i}}\right|v_{ub} \quad (14)$$

$$P_{lim,discharge} = |i_{max}|v_{lb} = \left|\frac{v_{OC} - v_{lb} - \sum_i^n \tilde{C}_{1,i}\tilde{x}_{i,0}e^{-\lambda_i t_d}}{R_0 - \sum_i^n \tilde{C}_{1,i}(1 - e^{-\lambda_i t_d})\frac{\tilde{B}_{i,1}}{\lambda_i}}\right|v_{lb} \quad (15)$$

where $i_{min}$ is calculated with $v_{lim}$ set to $v_{ub}$, and $i_{max}$ is calculated with $v_{lim}$ set to $v_{lb}$. The voltage limit $v_{ub}$ is a maximum terminal voltage limit of the battery and the voltage limit $v_{lb}$ is a minimum terminal voltage limit of the battery. The upper and lower terminal voltage limits may be predetermined values defined by the battery manufacturer. Prior art methods of battery power limit calculation rely on an electrical model (see FIG. 3) for calculating the battery power limits. In contrast, battery power limits may be calculated based on the reduced-order electrochemical battery model as disclosed herein.

Steady-State Power Capability Map

Figure 9:
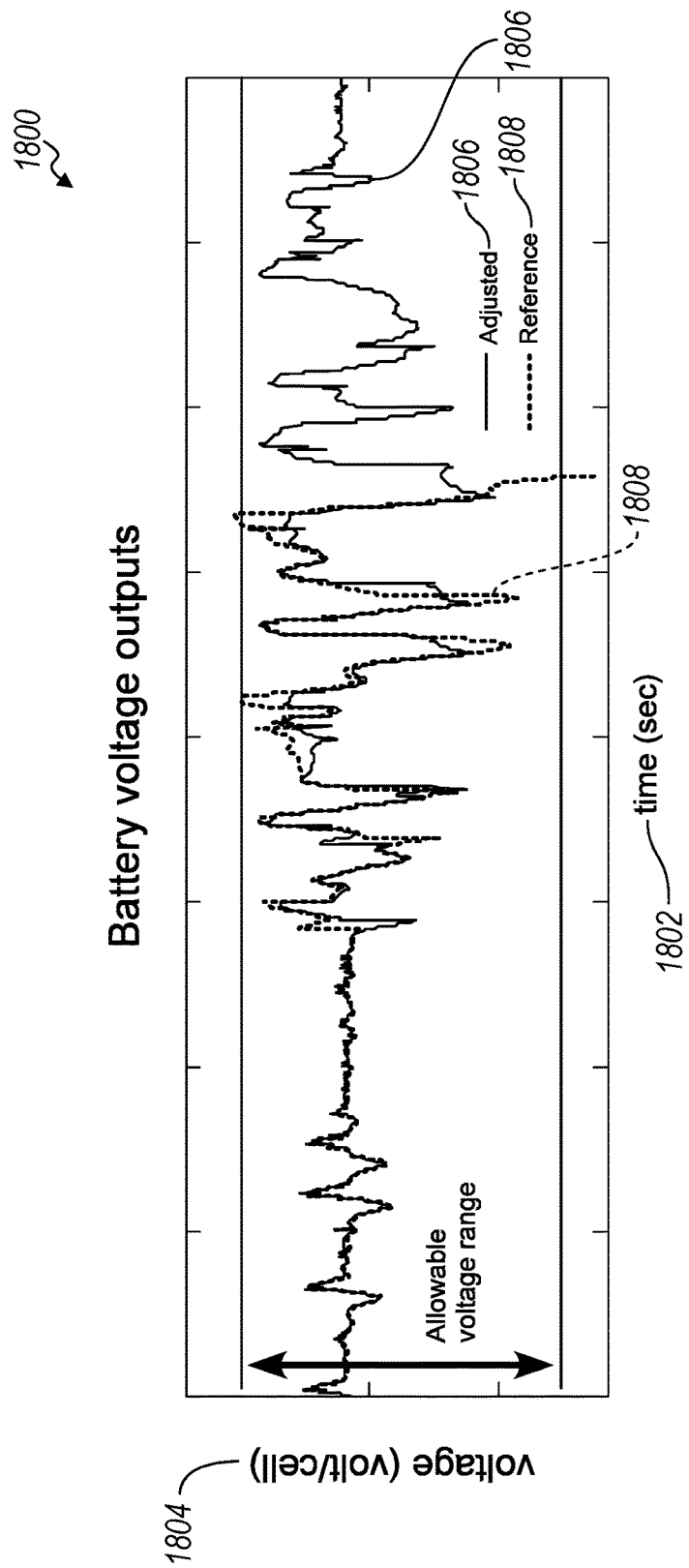
FIG. 9 is a graph depicting the battery voltage outputs.

Prior to putting the vehicle in service, a steady-state power capability map may be created from the vehicle power system and battery. The steady-state power capability map may include power limits based on SOC, terminal voltage, current usage, or power usage. The map may be based on ion concentrations after charge or discharge cycles. The ion concentration at the electrode, $c_s$, may fluctuate based on the battery state and distance, r, from the center of the electrode, as shown in FIGS. 9 and 16. The battery map may not account for all charging and discharging situations. The battery usage profiles may change optimal battery capabilities.

A power capability management strategy in a hybrid electric vehicle control system may include a steady-state power capability map, real-time power capability estimator, and an SOC estimator. The SOC estimator may provide SOC indication to both the steady-state power capability map and the real-time power capability estimator. The SOC estimator may include more than one method for SOC estimation and provide one or both results to each of the steady-state power capability map and the real-time power capability estimator. Each power capability estimator may also take into account battery temperature.

The real-time power capability estimator may determine a power capability $\hat{P}_{lim}$. The steady-state power capability map may determine a power capability $P_{lim}^{ref}$. A difference between the two power capability figures may be calculated using Equation (16).

$$\Delta P_{lim} = P_{lim}^{ref} - \hat{P}_{lim} \quad (16)$$

A dynamic power capability, $P_{lim}^{dyn}$, may be calculated using a power limit reference, $P_{lim}$, which may be different from $P_{lim}^{ref}$, and a controlled process variable $F(\Delta P_{lim})$, as shown in Equation (17). $P_{lim}$ may be an input from the HEV supervisory controller or the power demand input to the battery.

$$P_{lim}^{dyn} = P_{lim} + F(\Delta P_{lim}) \quad (17)$$

The function F( ) may be implemented as a proportional, integral, and derivative (PID) controller. Other control algorithms may be used. Although most PID controllers maintain a plant about a setpoint, the PID controller may be configured to, in this case, ensure drastic changes in the $\Delta P_{lim}$ term do not occur. The PID may be optimized to remove the integral portion of the controller altogether. The derivative term of the PID controller may be configured to account for future values based on the rate of change of $\Delta P_{lim}$.

$$F(\Delta P_{lim}) = -K_P \Delta P_{lim} - K_I \int \Delta P_{lim} dt - K_D \frac{d\Delta P_{lim}}{dt} \quad (18)$$

Equation (46) may provide a controlled, offset power capability based on the real-time power capability with respect to a reference power capability. The power capability adjustment may be used by the hybrid electric vehicles supervisory controller to manage power demand provided by the engine or motor of the vehicle.

Figure 6:
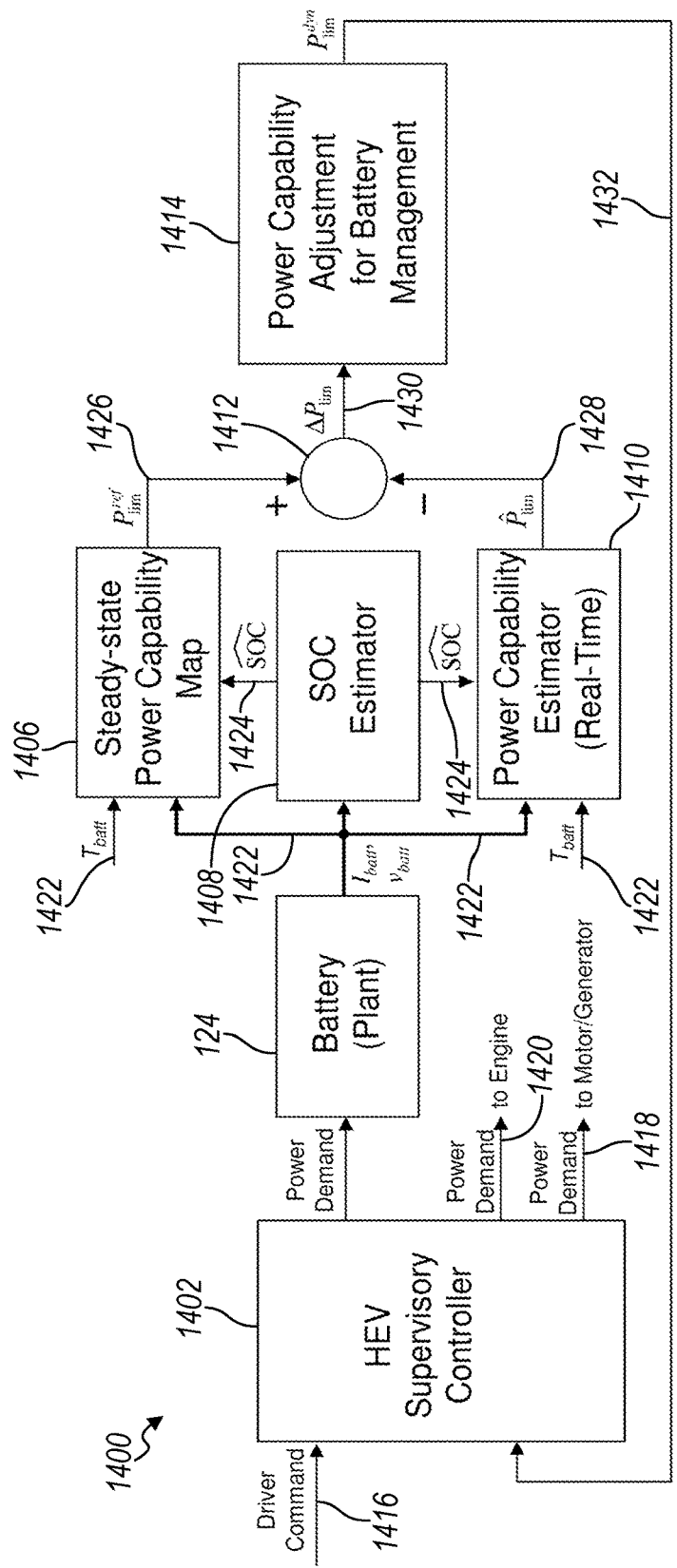
FIG. 6 is a schematic diagram of a control system used to adjust power capability estimations in vehicles.

Now referring to FIG. 6, a control system schematic 1400 is shown. An HEV supervisory controller 1402 receives a driver acceleration command 1416 and a dynamic power limit capability 1432. The driver acceleration 1416 command may be indicated from an autonomous vehicle or accelerator pedal. As another example, a cruise control system may provide acceleration requests. Based on battery power capabilities, the HEV supervisory controller may divide the power demand and send an engine power request 1420 and a motor power request 1418. The power requests 1420, 1418 may be received by a respected engine or motor controller. The motor controller may draw power from a vehicle traction battery 124 based on the derived power limit.

The battery 124 or battery instruments and controllers may provide temperature, current, and terminal voltage indication 1422 to a steady-state power capability map 1406, SOC estimator 1408, and real-time power capability estimator 1410. The SOC estimator 1408 may provide SOC indication 1424 to the real-time power capability estimator 1410 and steady-state power capability map 1406. SOC indication 1424 may be derived using the aforementioned methods. The steady-state power capability map 1406 may use the SOC from the SOC estimator ref 1408 along with the temperature, current, and terminal voltage indication 1422 to determine $P_{lim}^{ref}$ 1426. The steady-state power capability map 1406 may be a function having multiple inputs or a relational database having representative values for each of the battery states. The real-time power capability estimator 1410 may use one of the aforementioned real-time estimation methods to determine $\hat{P}_{lim}$ 1428.

An error calculation is performed at 1412 to determine the difference, $\Delta P_{lim}$ 1430, between $P_{lim}^{ref}$ 1426 and $\hat{P}_{lim}$ 1428. Drastic changes in the error signal $\Delta P_{lim}$ 1430 may be diminished by the power capability adjustment 1414 for battery management. The power capability adjustment 1414 may include a separate control algorithm to dampen drastic changes or latent discrepancies between the dynamic power capability, $P_{lim}^{dyn}$ 1432. $P_{lim}^{dyn}$ 1432 is a feedback input to the HEV supervisory controller 1402.

Figure 7:
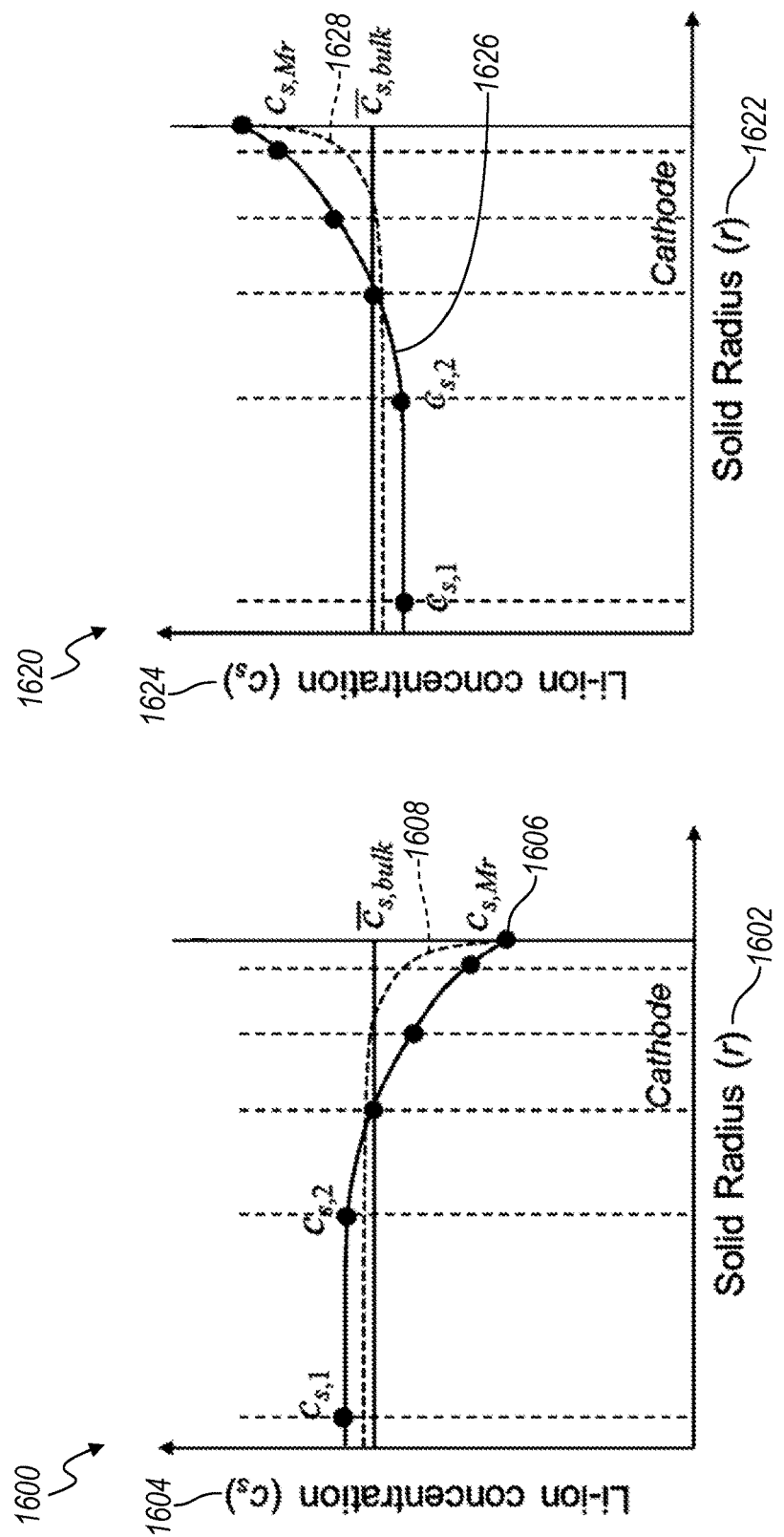
FIG. 7 is a graph depicting the ion concentration profiles at the electrodes after different charge cycles.

Now referring to FIG. 7, graphs 1600, 1620 showing potential causes of deviations from the steady-state power capability map are shown. Graph 1600 depicts the ion concentration, $C_s$, on the y-axis 1604 through an electrode, r, on the x-axis 1602 after mild charging as shown in curve 1606 and aggressive charging as shown in curve 1608. As shown in graph 1600, aggressive charging increases the ion concentration disproportionately on exterior sections of the electrode and causes a less-linear ion concentration throughout the electrode when compared with mild charging. Graph 1620 depicts the ion concentration, $C_s$, on the y-axis 1624 through an electrode, r, on the x-axis 1622 after mild discharging as shown in curve 1626 and aggressive discharging as shown in curve 1628. As shown in graph 1620, aggressive discharging increases the ion concentration disproportionately on exterior sections of the electrode and causes a less-linear ion concentration throughout the electrode when compared with mild discharging. A control system, as disclosed in FIG. 6, may properly adjust power capability factors to compensate for the changes in ion concentration at the electrode.

Figure 8:
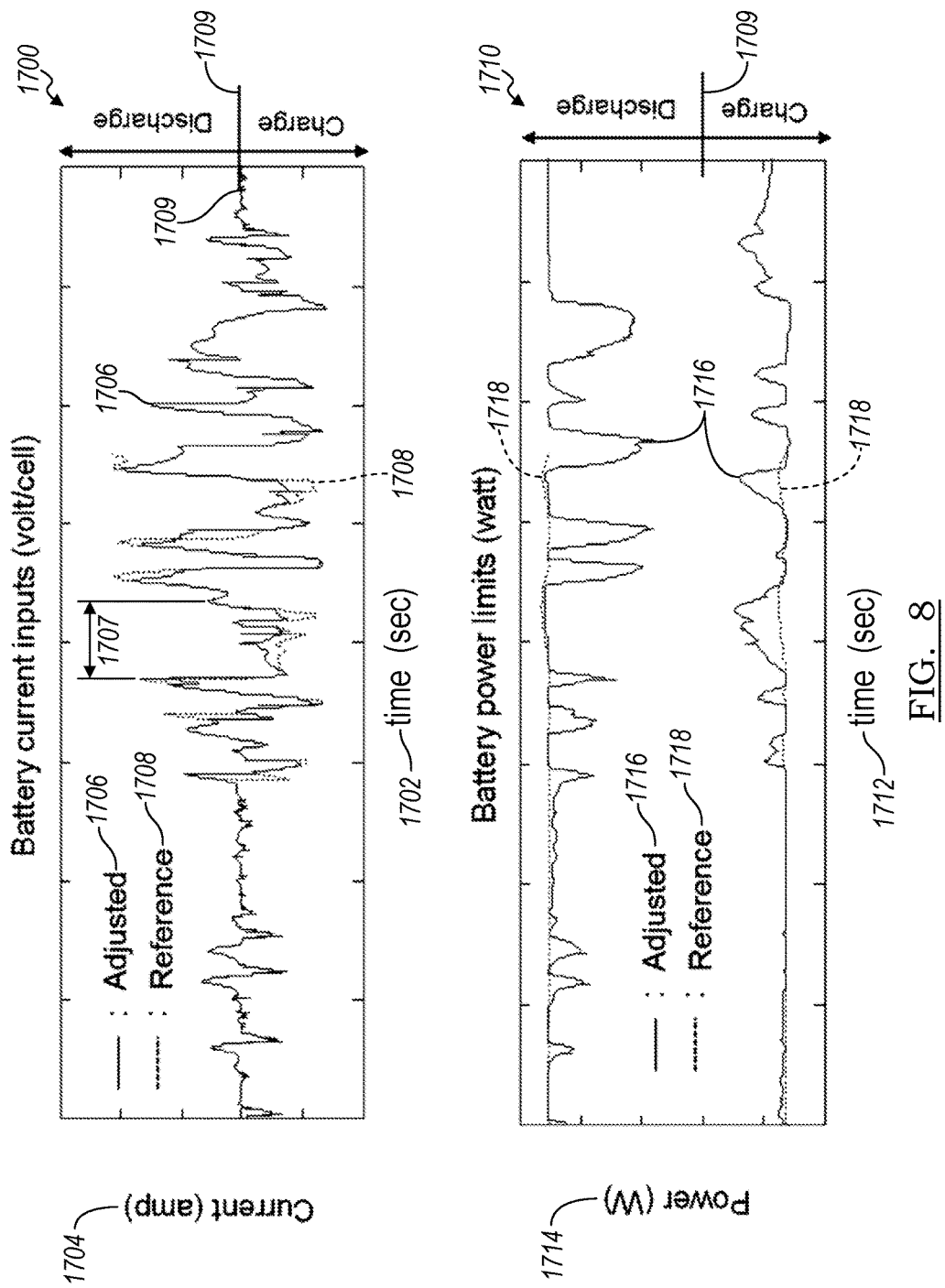
FIG. 8 is a graph depicting the battery current inputs and power limits.

Now referring to FIG. 8, a graph 1700 depicts the battery current inputs with and without estimation or adjustment. The magnitude of battery current input is indicated on the y-axis 1704 over time on the x-axis 1702. The reference current input 1708 is shown having undesirable current levels in region 1707. The adjusted current input 1706 addresses the undesirable current level. Similarly, graph 1710 depicts the variance in battery power limits over time. Battery charge and discharge are displayed simultaneously on opposite sides of the charge and discharge line 1709. The magnitude of the power limits are displayed on the y-axis 1714 over time on the x-axis 1712. The reference battery power limits 1718 are shown having a relatively constant magnitude when compared with the adjusted battery power limits 1716. The adjusted battery power limits 1716 may have a corresponding current change as shown in graph 1700. Similarly, in FIG. 9 a graph 1800 depicts the battery voltage outputs. The allowable magnitude of voltage on the y-axis 1804 over time on the x-axis 1802 is shown. The adjusted voltage output curve 1806 indicates different battery power limits with respect to the reference curve 1808.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery; and
a controller programmed to charge and discharge the battery according to an upper power limit conditioned via a PID controller configured to remove perturbations therefrom that is based on estimates of ion-concentration profiles of the battery such that for a given state of charge and temperature of the battery, the upper power limit decreases as the profiles become less-linear.

2. The vehicle of claim 1, wherein the upper power limit is further based on a difference between a predefined expected power capability limit at the given state of charge and a power capability limit estimated from a voltage output and current input associated with the given state of charge.

3. The vehicle of claim 2, wherein the predefined expected power capability limit is output from a steady-state power capability map.

4. The vehicle of claim 2, wherein the power capability limit estimated from the voltage output and current input is output from a real-time power capability estimator.

5. The vehicle of claim 1, wherein the PID controller has non-zero proportional and derivative gain.

6. A controller comprising:
input channels configured to receive voltage output and current input data associated with a given state of charge of a battery;
output channels configured to provide a power limit for the battery; and
control logic programmed to generate the power limit based on estimates of ion-concentration profiles derived from the data such that for a given state of charge and temperature of the battery, the power limit decreases as the profiles become less-linear.

7. The controller of claim 6, wherein the power limit is further based on a difference between a predefined expected power capability limit at the given state of charge and a power capability limit estimated from the data.

8. The controller of claim 7, wherein the predefined expected power capability limit is output from a steady-state power capability map.

9. The controller of claim 7, wherein the power capability limit estimated from the data is output from a real-time power capability estimator.

10. The controller of claim 6, wherein the power limit is conditioned via a transfer function configured to remove perturbations therefrom.

11. The controller of claim 10, wherein the transfer function is a PID controller.

12. The controller of claim 11, wherein the PID controller has a non-zero proportional and derivative gain.

13. A vehicle power system comprising:
a controller programmed to charge and discharge a battery according to an upper power limit that is based on
estimates of ion-concentration profiles of the battery such that for a given battery state of charge, the upper power limit decreases as the profiles become less-linear, and
a difference between a predefined expected power capability limit and a power capability limit estimated from a voltage output and current input.

14. The vehicle power system of claim 13, wherein the predefined expected power capability limit is output from a steady-state power capability map.

15. The vehicle power system of claim 13, wherein the power capability limit estimated from the voltage output and current input is output from a real-time power capability estimator.

16. The vehicle power system of claim 13, wherein the upper power limit is conditioned via a transfer function configured to remove perturbations therefrom.

17. The vehicle power system of claim 16, wherein the transfer function is a PID controller.

18. The vehicle power system of claim 16, wherein the PID controller has non-zero proportional and derivative gain.

\* \* \* \* \*